United States Patent

[11] 3,582,157

| [72] | Inventor | Edwin J. Hammon |
| | | Cuyahoga, Ohio |
| [21] | Appl. No. | 758,453 |
| [22] | Filed | Sept. 9, 1968 |
| [45] | Patented | June 1, 1971 |
| [73] | Assignee | Lempco Industries, Inc. |
| | | Cleveland, Ohio |

[54] BEARING ASSEMBLY HAVING AN INTERFERENCE-FIT BEARING SURFACE OF SYNTHETIC RESIN MATERIAL
2 Claims, 6 Drawing Figs.

[52] U.S. Cl. .................................................. 308/4,
308/238, 287/87
[51] Int. Cl. .................................................. F16c 17/00
[50] Field of Search .................................................. 308/4.4 C,
237, DIG 7, 238; 287/87

[56] References Cited
UNITED STATES PATENTS

| 2,690,360 | 9/1954 | Young | 308/N |
| 2,815,253 | 12/1957 | Spriggs | 308/N |
| 2,885,235 | 5/1959 | Moskovitz | 287/87 |
| 2,973,183 | 2/1961 | Alger | 308/N |
| 3,112,115 | 11/1963 | Smith | 308/4X |
| 3,273,944 | 9/1966 | Hammon | 308/4C |
| 3,332,133 | 7/1967 | Rye | 308/4 |
| 3,441,328 | 4/1969 | Hurley | 308/238 |
| 3,212,827 | 10/1965 | Brettrager | 308/N |
| 3,363,745 | 1/1968 | Thuerman et al. | 308/238X |
| 3,382,017 | 5/1968 | Cripe | 308/238 |

FOREIGN PATENTS

| 641,447 | 5/1962 | Canada | 308/4 |

Primary Examiner—Manuel A. Antonakas
Attorney—William S. Rambo

ABSTRACT: A linearly movable bearing assembly for a die set or the like in which relatively telescoping, reciprocal, metallic guide post and bushing members are provided with an intervening layer or coating of polytetrafluoroethylene, or similar low coefficient of friction plastic material, and wherein the layer or coating is arranged normally to provide an interference fit between the pin and bushing members.

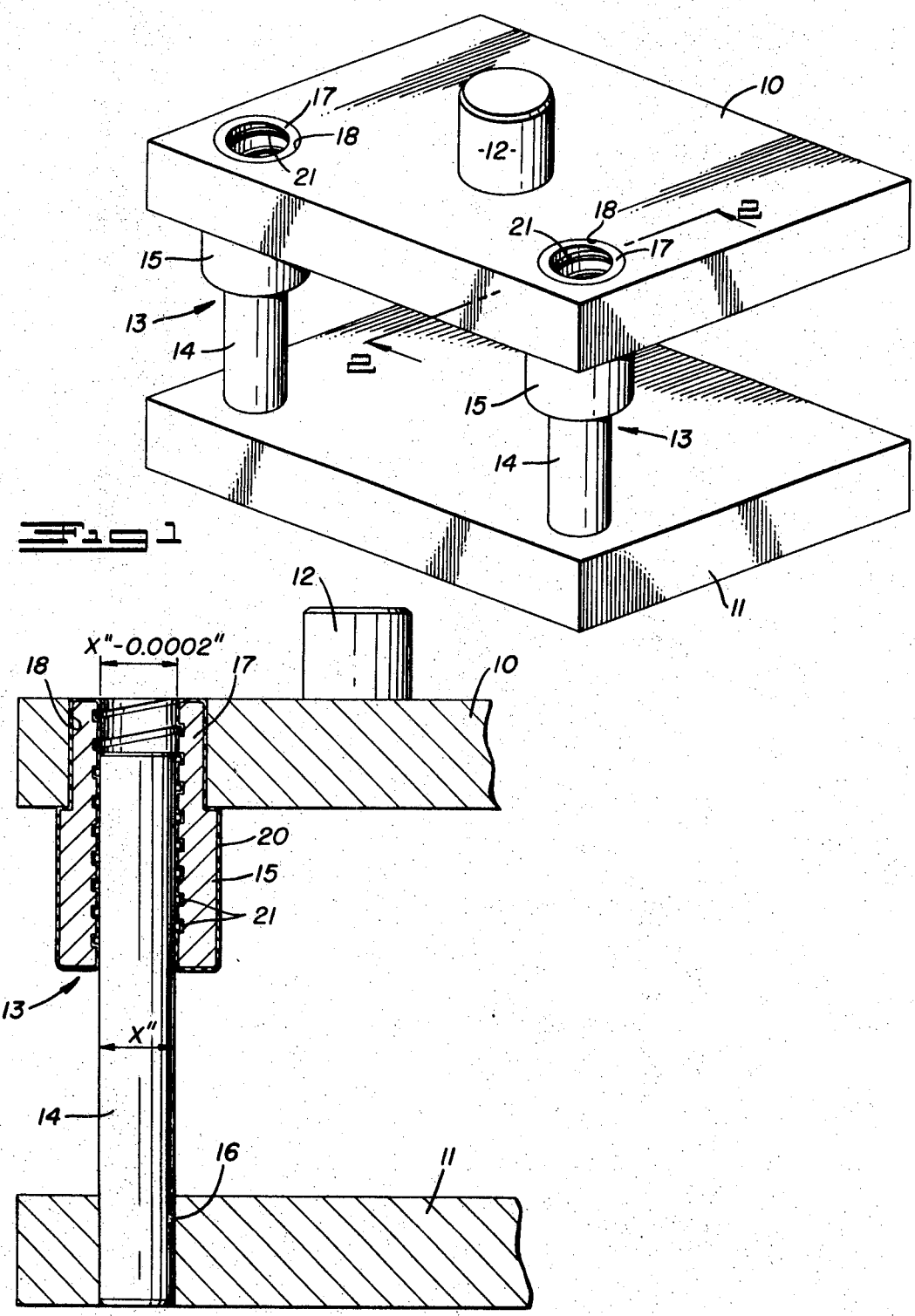

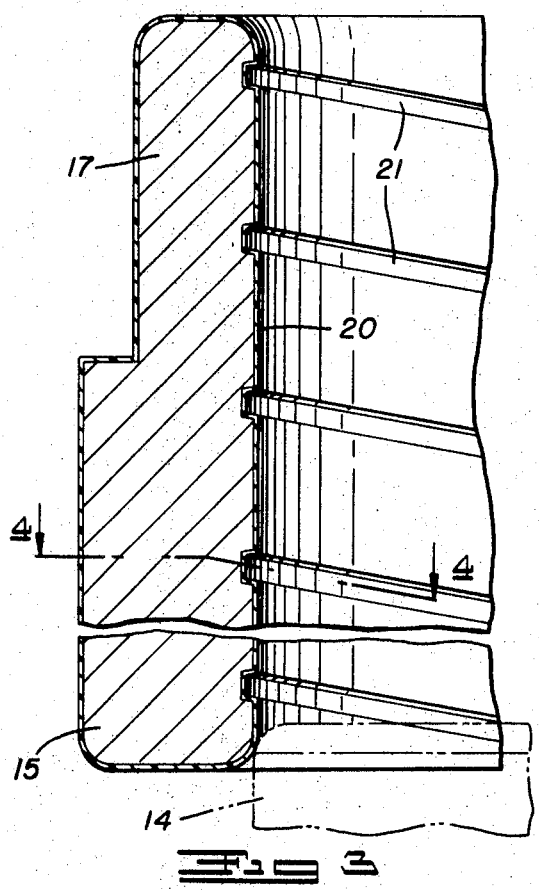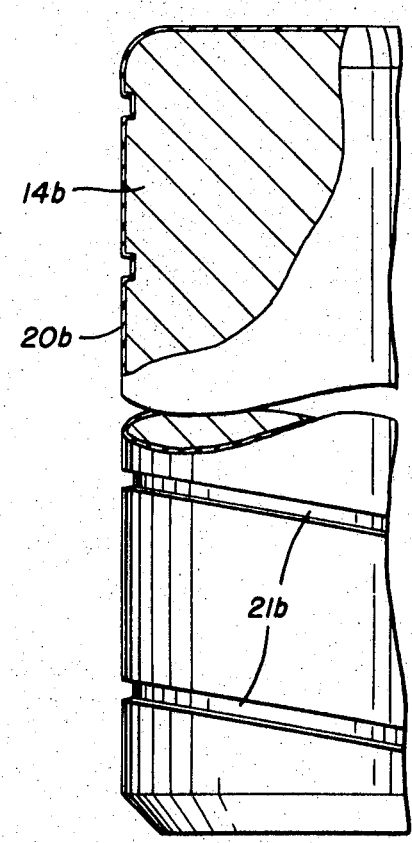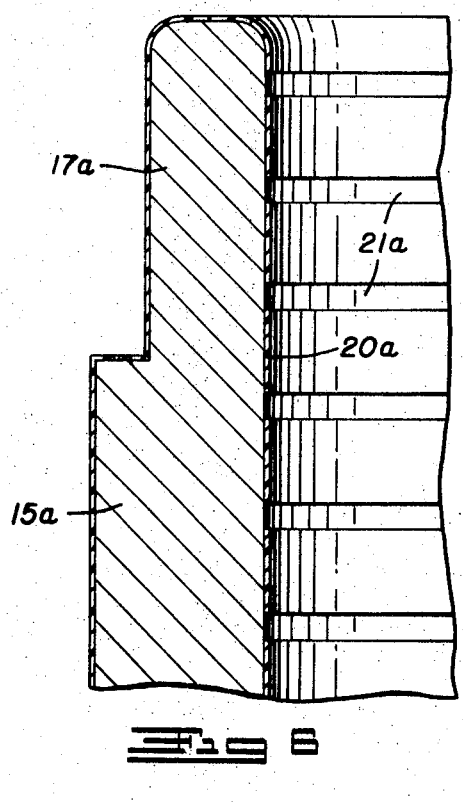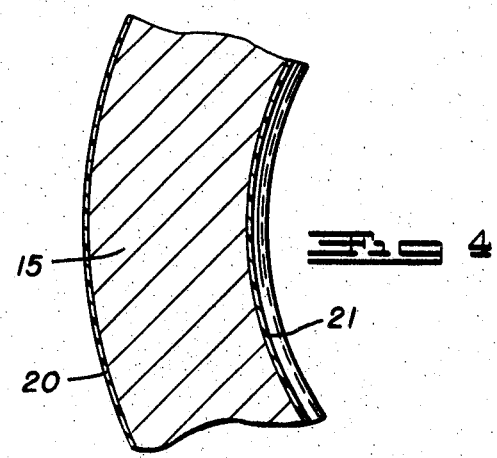

BEARING ASSEMBLY HAVING AN INTERFERENCE-FIT BEARING SURFACE OF SYNTHETIC RESIN MATERIAL

BACKGROUND OF THE INVENTION

The present invention relates generally to bearing assemblies and more particularly to a bearing assembly composed of relatively telescoping, linearly movable shaft and bushing members, such as, for example, the guide pin and bushing members of a die or mold set.

In the past, die sets have been classified according to the types of bearing assemblies used therein, namely: friction-type die sets and antifriction-type die sets. In friction-type die sets, the relatively movable die and punch-supporting plates are provided, respectively, with relatively telescoping guide pins and bushings which closely interfit with one another to maintain the plates in exacting alignment during relative reciprocation thereof. In the antifriction-type die set, the guide pins and bushings are radially spaced and are usually separated by an arrangement of preloaded ball or roller bearings. This invention relates more specifically to, and aims to provide an improvement in the bearing assemblies of friction-type die sets.

The principal difficulties encountered with so-called friction-type bearing assemblies stem from the relatively close working tolerances between the shaft (guide pin) and bushing members and the consequent friction encountered during high-speed reciprocation thereof. As will be readily understood, these members require constant and efficient lubrication to prevent extreme wear, seizure and breakage. At the same time, the working clearance or tolerance between the reciprocating shaft and bushing members must be relatively close, in order to prevent undesired radial and/or rotational misalignment of the parts associated with such members. This requirement, coupled with the relatively high speeds of operation of these bearing assemblies, make it difficult to maintain proper lubrication of these members.

SUMMARY AND OBJECTS OF INVENTION

The present invention aims to overcome the aforementioned difficulties by providing a bearing assembly comprised of relatively reciprocal, interfitting metallic members, wherein one of said members is provided with an adherent coating or layer of synthetic resin material having a relatively low coefficient of friction and a thickness to normally provide an interference fit between such members, and wherein the coating or layer of synthetic resin material is recessed or relieved in certain areas thereof so as to permit resilient flow of such material into the space or spaces created by such recesses in response to the forces imposed thereon by the interference fit or "preloaded" condition of the material.

The primary object of this invention is to provide a bearing assembly for a die set or the like in which the clearance between a pair of relatively reciprocal and interfitting members is zero or less and wherein the bearing assembly is substantially self-lubricating.

BRIEF DESCRIPTION OF DRAWINGS

In the accompanying drawings:

FIG. 1 is a perspective view of a die set having bearing assemblies according to the present invention;

FIG. 2 is a vertical sectional view taken through one of the bearing assemblies on a plane indicated generally by the line 2-2 of FIG. 1;

FIG. 3 is an enlarged, fragmentary vertical sectional view taken through a tubular bushing which is provided with an interference fit-producing coating of synthetic resin according to the present invention;

FIG. 4 is a fragmentary horizontal sectional view taken along the line 4-4 of FIG. 3;

FIG. 5 is an enlarged, fragmentary elevational view, partially in vertical section of a bearing pin, post, or shaft provided with an outer coating, layer or bearing surface of synthetic resin material according to this invention; and FIG. 6 is a vertical sectional view similar to FIG. 3, but illustrating a modified method of recessing or relieving the synthetic resin coating on the bushing of the bearing assembly.

DETAILED DESCRIPTION OF PREFERRED EMBODIMENTS OF THE INVENTION

Referring now to FIGS. 1 and 2 of the drawings, there is illustrated a die set made up of the usual upper and lower punch and die-supporting plates or shoes 10 and 11, respectively. The upper shoe 10 is equipped with the usual upstanding shank 12 which is adapted to be clamped, chucked, or otherwise secured to the movable platen or ram of a press, not shown, so as to be movable in unison therewith. The lower shoe 11 of the die set is adapted to be secured in the usual manner to the relatively stationary bed of the press, not shown. In operation, the upper and lower shoes 10 and 11 of the die set support relatively engageable punch and die parts, also not shown, and the upper shoe 10 is reciprocated toward and away from the low shoe 11 during each working stroke or cycle of the press to bring the mating punch and die parts into relative engagement. To maintain the desired alignment between the upper and lower shoes and their associated punch and die members, the die set is provided with one or more reciprocating bearing assemblies, indicated generally by the reference numeral 13.

Each of the bearing assemblies 13 comprises a guide pin, post, or shaft 14 and a relatively reciprocable and telescoping bushing 15. In the die set shown in the drawings, the guide pin 14 of each bearing assembly is of elongated, solid, cylindrical form and has its lower end portion press-fitted or otherwise rigidly secured in a bore or socket 16 formed in the lower shoe 11. The bushing 15 of each bearing assembly is formed with a relatively reduced diameter upper end portion or neck 17 which is likewise press-fitted or otherwise securely fastened in a bore or socket 18 formed in the upper shoe 10. However, as will be readily apparent to those familiar with the art, the positions of the guide pins 14 and the bushings 15 may be reversed between the respective upper and lower shoes 10 and 11 if desired.

According to the present invention, the bodies of the guide pin 14 and the bushing 15 are of metallic composition, preferably hardened steel, and one or the other of these members is provided with a tough, strongly adherent coating or layer of a synthetic resin material having a relatively low coefficient of friction, and preferably possessing the property of self-lubrication. The coating or layer of synthetic resin material provides a relatively thin bearing surface between the metallic body portions of the guide pin and bushing, and is so dimensioned in its thickness as to provide an initial interference fit between the pin and bushing. The coating or layer of synthetic resin material preferably consists of polytetrafluoroethylene (Teflon) which is initially applied in liquid form to the precleaned and acid-treated metal piece by spraying or dipping, and which is then baked in situ on the metal piece to the desired solid consistency. It should here be understood that the particular method or process of applying the coating or layer of polytetrafluoroethylene to the metal bushing or guide pin, as the case may be, is well known and is the same as that heretofore employed in the application of this resin to frying pans and other metal cooking utensils. While polytetrafluoroethylene is looked upon as a preferably synthetic resin material for the purposes of this invention, due to its unusually low coefficient of friction and its self-lubricating properties, it will be understood that other types of synthetic resin materials may be employed with substantially equal results. For example, a polyamide (nylon) resin impregnated with a dry lubricant, such as, molybdenum sulfide, or one of the self-lubricating fluoroplastics, may be used as the coating material. So, also an isocyanate resin, such as polyurethane, impregnated with one or more of the previously mentioned dry lubricants may be substituted for the preferred polytetrafluoroethylene as the coating material.

Returning now to the drawings, FIGS. 1—4 illustrate the coating or layer 20 of synthetic resin material applied to all exposed surfaces of the bushing 15. It will be understood, however, that the coating or layer 20 of synthetic resin material may, alternatively, be applied only to the inner wall surfaces (I.D.) of the bushing, rather than to the entire exposed surfaces thereof, in order to accomplish the aims of the invention. However, it is preferable that the coating 20 be applied to the outer surface of the mounting portion or neck 17 of the bushing 15, in addition to the inner wall surface thereof, so that the diameter of the socket 18 of the upper shoe or plate 10 need not be machined or sized with the high degree of accuracy or tolerance which would otherwise be required of a metal-to-metal press fit.

As shown particularly in FIGS. 2 and 3 of the drawings, the inner, cylindrical wall (I.D.) of the bushing 15 is formed with a relatively shallow and narrow continuous spiral groove or recess 21, the wall surfaces of which are also coated or covered with the coating of synthetic resin material. The groove 21 is preferably milled or otherwise machined into the inner wall of the bushing prior to the application of the coating 20 to the metallic bushing body, in order that the applied coating will be integral throughout the full inner wall surface of the bushing. However, as indicated in the modified form of bushing shown in FIG. 6, the coating or layer 20a may be recessed or relieved in other ways, such as by simply cutting or machining a series of axially spaced, annular grooves or recesses 21a in the coating or layer 20a which has been previously applied to the smooth inner wall surface of the bushing 15a. Regardless of the particular method employed in recessing or relieving the inner wall surface of the coating or layer of synthetic, it has been found essential to provide sufficient space or spaces within the coating to accommodate for the resilient flow or displacement of the coating material in response to the radial compressive forces applied to the coating material upon telescoping movement of the guide pin 14 within and through the axial bore of the bushing.

As previously indicated, the relative dimensions of the outer diameter of the guide pin 14, the inner diameter of the metal bushing 15 and the thickness of the coating 20 are such that the coating, in its relaxed condition, provides an interference fit between the pin and bushing. For example, assuming that the clearance between the outer diameter of the pin 14 and the inner diameter of the metal body of the bushing 15 (disregarding the depth of the grooves 21) is 0.001 inch, then the thickness of the coating 20 on the inner wall surface of the metal body of the bushing would be at least 0.001 inch and preferably 0.0011 to 0.0012 inch. In other words, the thickness of the coating 20 preferably exceeds the designed clearance between the metal bodies of the pin 14 and bushing 15 by 0.0001 to 0.0002 inch. Thus, as illustrated in FIG. 2, if the outer diameter of the guide pin 14 is X inch, then the inner diameter of the coated bushing 15 (disregarding the grooves 21) would preferably be X minus 0.0002 inch. For best results, it has been found that the thickness of the coating 20 of synthetic resin on the inner wall surface of the bushing should be at least 0.001 inch, but preferably not greater than 0.010 inch. It should be explained that the relative dimensions or proportions of the coating 20 and the grooves 21 have been greatly exaggerated in the various FIGURES of the drawings solely for the purpose of clarity of understanding, and that in the actual bearing assemblies, the size of the grooves 21 and thickness of coating would be greatly reduced over that illustrated in the drawings.

FIG. 5 of the drawings illustrates another modification of the invention, wherein the guide pin 14b, rather than its associated bushing, is provided with an outer coating or bearing surface layer 20b of the synthetic resin material. In this instance, the metal body of the pin 14b is formed on its outer surface with a continuous, spiral groove or recess 21b prior to the application of the coating 20b thereon. The groove or recess 21b serves the same purpose as the groove 21 in permitting resilient flow or displacement of synthetic resin material into the space or spaces provided by the groove 21b when the pin and bushing are brought into relative telescoping engagement.

While certain preferred embodiment of the present invention have been illustrated and described in detail, it will be understood that various modifications and changes in details of construction and design may be resorted to without departing from the spirit of the invention or the scope of the following claims.

Having thus described this invention, what I claim is:

1. In a die set; a pair of relatively reciprocative die-supporting plates and means for maintaining said plates in parallel relation during relative reciprocation thereof, said means comprising a guide pin carried by one of said plates and a bushing carried by the other of said plates and arranged to telescope said pin with an annular clearance therebetween, and a layer of resilient yieldable, synthetic resin material having a thickness greater than said clearance and disposed under compressive loading between said pin and bushing, said layer of resin material being recessed at intervals to provide space into a portion of said material may be displaced.

2. In a die set, a pair of relatively reciprocative die-supporting plates and means for maintaining said plates in parallel relation during relative reciprocation thereof, said means comprising a guide pin carried by one of said plates and a bushing carried by the other of said plates and arranged to telescope said pin with an annular clearance therebetween, a layer of resiliently yieldable, synthetic resin material having a thickness greater than said clearance and disposed under compressive loading between said pin and bushing, and wherein space is provided into which a portion of said material may be displaced.